United States Patent [19]

Purdie, deceased

[11] 4,453,610

[45] Jun. 12, 1984

[54] BEAM SCALE WITH THREE POISES

[75] Inventor: Clarence E. Purdie, deceased, late of Faribault, Minn., by Irene D. Purdie, executor

[73] Assignee: Gopher Shooter's Supply Company, Incorporated, Faribault, Minn.

[21] Appl. No.: 412,159

[22] Filed: Aug. 27, 1982

[51] Int. Cl.³ .................... G01G 1/36; G01G 23/14
[52] U.S. Cl. .................................. 177/247; 177/171
[58] Field of Search ............................ 177/171, 247

[56] References Cited

U.S. PATENT DOCUMENTS

| 202,800 | 4/1878 | Fairbanks | 177/247 X |
| 207,263 | 8/1878 | Fairbanks | 177/171 X |
| 2,210,800 | 8/1940 | Devine | 177/171 X |
| 3,027,958 | 4/1962 | Gabloffsky | 177/247 |
| 4,022,289 | 5/1977 | Sauter | 177/247 |

FOREIGN PATENT DOCUMENTS 571406  5/1924  France .............................. 177/247

Primary Examiner—George H. Miller, Jr.
Attorney, Agent, or Firm—Clayton R. Johnson

[57] ABSTRACT

A scale having a base provided with spaced first and second upright posts, a beam having an intermediate portion pivotally mounted by the first post, a pan dependingly pivotally mounted by the beam first end portion remote from the posts, the beam having a first series of serrations between the first post and the pan and first graduated indicia in registry with the first serrations, a second series of serrations and second indicia in registry with the second serrations on the opposite side of the first post from the first serrations, a third series of serrations and third indicia on the opposite side of the second serrations from the first post, and comparator scale indicia on the beam second end portion that are in the same plane as the resting point locator indicium on the second post and closely adjacent thereto and a poise for each series of indicia. Each of the second series of graduations is equal to one unit of weight, each of the first series equal to 0.1 unit of weight and each of the third series equal to a 0.01 unit of weight. As a result, the final and fine adjustment is with the poise on the beam very close to the stationary resting point locator indicia. This makes it easier to make the final adjustment as the user does not have to shift his eyes from left to right consistently while making the final changes of the third poise.

6 Claims, 3 Drawing Figures

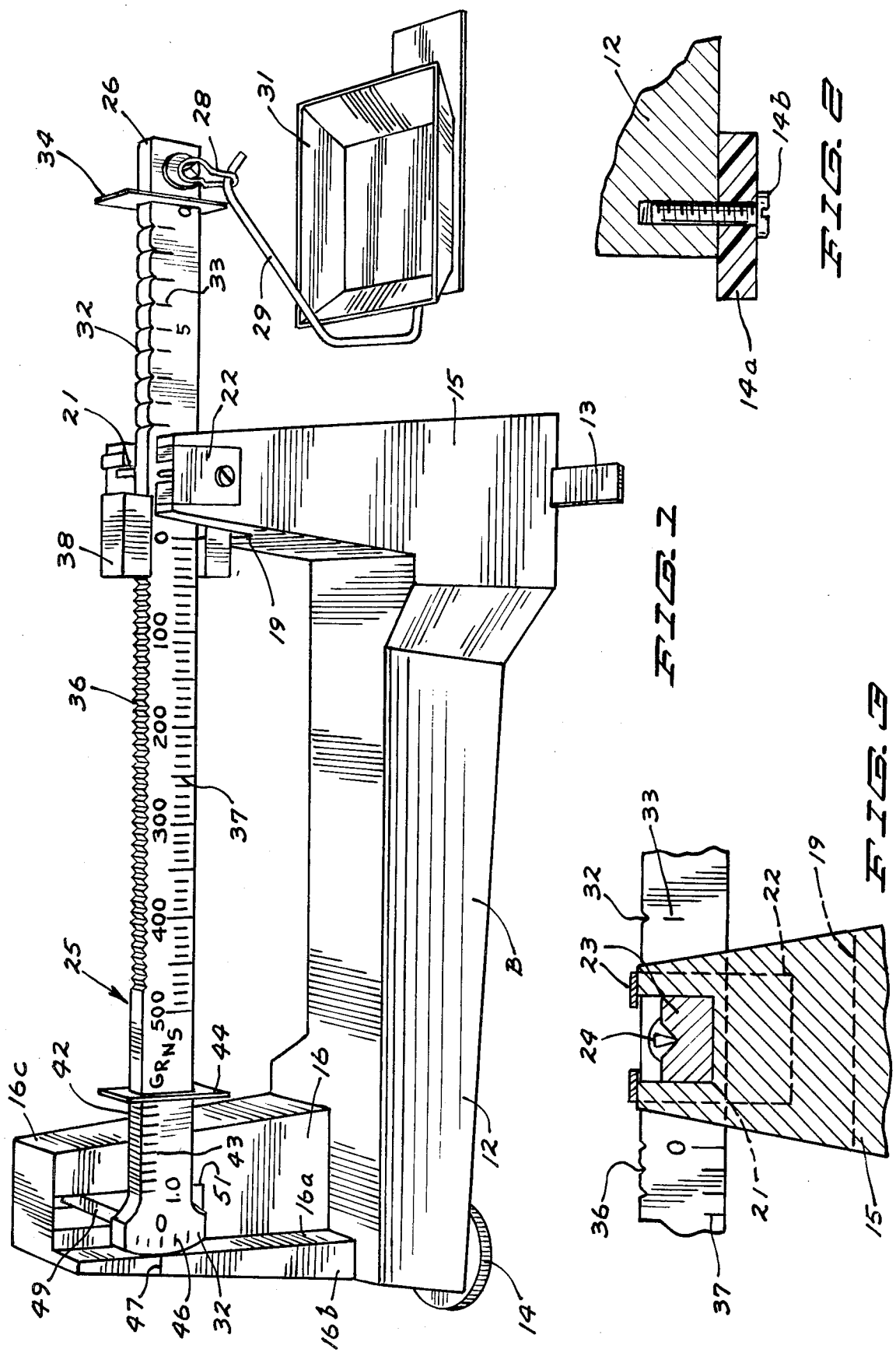

BEAM SCALE WITH THREE POISES

BACKGROUND OF THE INVENTION

A beam type scale particularly useful for weighing powder, shot and bullets for use in reloading cartridges.

In the prior art, it is known to provide three poises that are slidably adjustable on the beam of a scale with one poise being firmly retained by a set screw in an adjusted position for balancing the weight of a pan when empty and the other two poises on the opposite sides of a post that pivotally mounts the beam, see U.S. Pat. Nos. 202,800 and 207,263 to Fairbanks. Also, it is old to provide a beam type scale having comparator scale indicia on the beam end portion that is in the same plane as the rest point locator indicium on the second post of the scale and closely adjacent thereto. However, with such prior art scales, in ascertaining the weight of the contents of the pan (load) during the time of making the last poise adjustments one constantly has to be shifting ones eyes from left to right, i.e. from one side of the beam pivot support post to the other.

In order to overcome problems such as the above, as well as others, this invention has been made.

SUMMARY OF INVENTION

A scale having a base with spaced upright first and second posts, a beam having an intermediate portion pivotally mounted on the first post, a pan dependingly mounted on the beam first end portion which is remote from the first post and on the opposite side of the first post from the second post, the beam having first graduated indicia on the opposite side of the first post from the second post, second graduated indicia on the opposite side of the first post from the first indicia and third graduated indicia on the opposite side of the second indicia from the first post, the units of weight represented by the third indicia being much smaller than those represented by those of each of the first and second indicia, comparator scale indicia on one of the second post and beam second end portion and a resting point locator on the other, and a poise adjustably positionable in the beam for each of the first, second and third indicia.

An object of this invention is to provide a beam type scale having new and novel means to make it easier for the user to make the final poise adjustments in ascertaining the weight of the contents in the scale pan.

BRIEF DESCRIPTION OF THE DRAWINGS

FIG. 1 is a side view of the scale of this invention;

FIG. 2 is a fragmentary cross sectional view to show the zero balance mechanism; and FIG. 3 is a fragmentary cross sectional view to further illustrate the pivotal mounting of the beam.

Referring to the drawings, the scale of this invention includes a base B having an elongated main body 12 provided with feet 13, 14 for supporting the main body in a level condition. The foot 13 comprises a stabilizing bar that extends beneath the main body and transversely outwardly of either side thereof which is secured to one end of the main body by a screw (not shown) extended through a counterbore (not shown) in the bar so as not to extend below the bottom surface of the bar. The foot 14 is transversely centrally mounted on the other end of the main body and includes a leveling knob 14a that is mounted by a button head screw 14b which is threaded into the main body. The knob is adhesively adhered or otherwise appropriately mounted on screw 14b so that the screw rotates with the knob and the button head abuts against the support surface for the scale.

The main body also includes a first upright post 15 having a lower end integrally joined to one end portion of the main body and a second upright post 16 spaced from the first post and having a lower end integrally joined to the other end portion of the main body. A slot 19 extends longitudinally through the upper end portion of the post 15 while cross slots 21 extend transversely through the legs of the post 15 that are on opposite sides of slot 19.

Side plates 22 are mounted on opposite sides of post 15 to extend along remote ends of slots 21 and in part, overhang slots 21 for removably mounting bearings 23 in the slots. Bearings 23 pivotally mount a knife edge beam pivot 24 to extend into V-shaped grooves of the bearings, and transversely through slot 19. The beam pivot is joined to an intermediate portion of an elongated beam, generally designated 25, which extends through slot 19.

A suitable mounting device 18 is mounted on the end portion 26 of the beam which is on the opposite side of the first post from the second post and remote from the first post. The mounting device dependingly supports a pan support 29 for free swinging movement, a pan 31 being mounted by the pan support. The upper edge of the beam is provided with a first series of serrations 32 while beneath the serrations there is a first series of graduated indicia 33 in registry with the serrations 32. A first poise 34 is provided on the beam between the first post and the mounting device and is slidably adjusted thereon to extend into the desired one of the serrations 32.

On the opposite side of the beam pivot from the serrations 32, the upper edge of the beam is provided with a second series of serrations 36 while beneath the serrations 36 there is a second series of graduated indicia 37 in registry therewith. A second poise 38 is provided on the beam and is slidably adjusted on the beam; and is provided with a pointed edge (not shown) extendable into the selected one of the serrations 36 and a marker alignable with the respective graduation that is aligned with indicia for the serration 36 that the pointed edge extends into.

Closely adjacent the beam second end portion 32 and between the second end portion and the second series of serrations, the upper edge of the beam is provided with a third series of serrations 42 while beneath the serrations 42 there is a third series of graduated indicia 43 in registry therewith. A third poise 44 is provided on the beam and is slidably adjusted thereon to extend into the desired one of the serrations 42.

The second post has a transversely extending vertical leg 16a with a front surface 16b in the plane of front surface of the beam, the leg extending very close to the second end portion of the beam. Graduated comparator scale indicia 46 are provided on the front surface of the beam second end portion while a resting point indicator indicium 47 is provided on front surface 16b.

A transversely extending rod 49 is joined to the second edge portion of the beam and extends into a rectangular opening 51 in the second post leg 16c to limit the amount of pivoting of the beam about its pivot.

The second poise 38 is of a substantially greater weight than the first poise 34 while the first poise is of a greater weight than the third poise 44. Further, each of the second series of graduations is equal to one unit of weight, each of the first series is equal to 0.1 unit of weight and each of the third series is equal to 0.01 unit of weight. For example, if the scale is a grain scale, the second poise is for measurement of 10 grains, the first poise for 1 grain and the third poise for 1/10th grain.

Before using the scale, the knob 14a is turned in the appropriate direction until the zero indicium 46 is aligned with the rest point indicator 47. The item or material (load) to be weighed is placed in the pan, the second poise moved along the beam to the proper one of serrations 36 and the first poise moved along the beam to the appropriate one of serrations 32. Now the minimum weight poise 44 is moved for making the final adjustments. Since the minimum weight serrations 42 are located closely adjacent the comparator scale and resting point indicator, the eyes do not have to be shifted while making the final adjustments. Further the provision of three poises provides for better accuracy and convenience.

What is claimed is:

1. A scale comprising a base that includes a first upright post and a second upright post spaced from the first post, an elongated beam having an intermediate portion, a first end portion on the opposite side of the first post from the second post, and an opposite second end portion adjacent the second post, means for pivotally mounting the beam intermediate portion on the first post, a pan dependingly mounted by the beam first end portion, cooperating means on the beam second end portion and on the second post for indicating when the scale is in balance, said beam having a first series of graduated indicia between the pivot means and the beam first end portion, a second series of graduated indicia between the second post and the pivot means and a third series of graduated indicia between the second series of indicia and the beam second end portion and closely adjacent the beam second end portion, a first poise slidably adjustably on the beam relative to and adjacent the first series of indicia, a second poise slidably adjustably on the beam relative to and adjacent the second series of indicia, and a third poise slidably adjustable on the beam relative to and adjacent the third series of indicia, the third series of indicia being graduated for units of weight that are smaller than the units of weight of each of the first and second series of indicia.

2. The scale of claim 1 further characterized in that zero adjustment means is provided on the base for balancing the scale when the pan is in a no load condition.

3. The scale of claim 1 further characterized in that the beam has an upper edge that has a first series of serrations aligned with the first series of indicia, a second series of serrations aligned with the second series of indicia and a third series of serrations aligned with the third series of indicia.

4. The scale of claim 3 further characterized in that the second poise is of a greater weight than the first poise and that the first poise is of a greater weight than the third poise.

5. The scale of claim 3 further characterized in that the series of graduations are graduated to have each of the first series of graduations equal to 0.1th unit of weight of each of the second series, and each of the third series of graduations equal to 0.1th unit of weight of each of the first series.

6. The scale of claim 3 further characterized in that the cooperating means includes comparator scale indicia on one of the second post and the beam second end portion and resting point locator indicia on the other.

* * * * *